United States Patent [19]

Hamatani

[11] 4,269,479
[45] May 26, 1981

[54] MOUNTING SYSTEM FOR OPTICAL LENS ASSEMBLY

[75] Inventor: Masahide Hamatani, Yokohama, Japan

[73] Assignee: Canon Kabushiki Kaisha, Tokyo, Japan

[21] Appl. No.: 5,465

[22] Filed: Jan. 22, 1979

[30] Foreign Application Priority Data

Feb. 2, 1978 [JP] Japan .............................. 53-11728[U]

[51] Int. Cl.³ ................................................ G02B 7/04
[52] U.S. Cl. ..................................... 350/255; 350/429
[58] Field of Search ......................... 350/187, 252, 255

[56] References Cited

U.S. PATENT DOCUMENTS

| | | | |
|---|---|---|---|
| 2,932,237 | 4/1960 | Back | 350/255 UX |
| 2,956,492 | 10/1960 | Quick | 350/252 UX |
| 3,168,610 | 2/1965 | Kende | 350/187 |
| 3,472,564 | 10/1969 | Kellner | 350/255 X |
| 3,663,093 | 5/1972 | Iida | 350/187 |
| 4,021,101 | 5/1977 | Camerik | 350/255 |

FOREIGN PATENT DOCUMENTS 2137490 2/1973 Fed. Rep. of Germany ........... 350/255
16225 2/1977 Japan ..................................... 350/255

*Primary Examiner*—F. L. Evans
*Attorney, Agent, or Firm*—Toren, McGeady and Stanger

[57] ABSTRACT

In an optical lens assembly including front and rear lens systems which are movable relative to each other for focusing or zooming operation, and which include an inner barrel in which one lens system is mounted and an outer barrel in which the other lens system is mounted, there is provided a device for imparting resiliency between the inner and outer barrels which are movable relative to each other. The resilient device may be in the form of a plurality of strips made of resilient material or in the form of an apertured or embossed cylindrical tube, with the resilient device being fixed relative to one of the barrels. The resilient members are made of a lubricant material to impart a degree of lubricity between relatively movable members of the assembly.

6 Claims, 17 Drawing Figures

F I G.5(a)
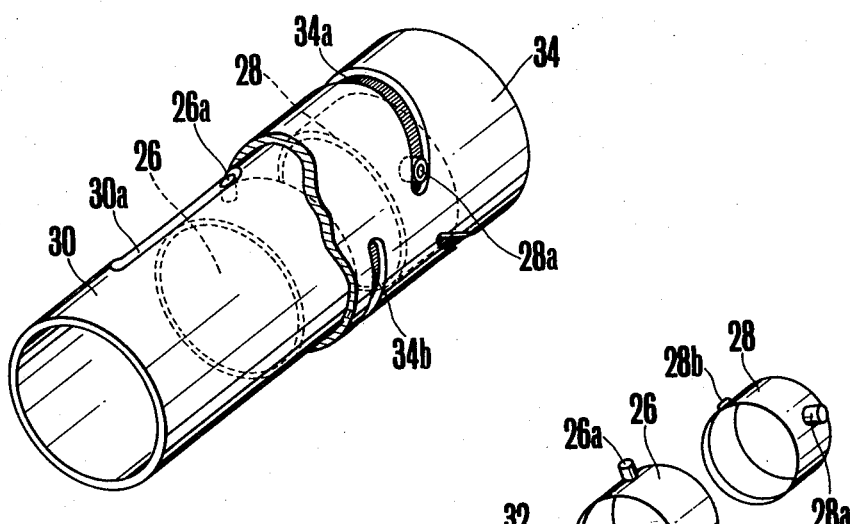
F I G.5(b)
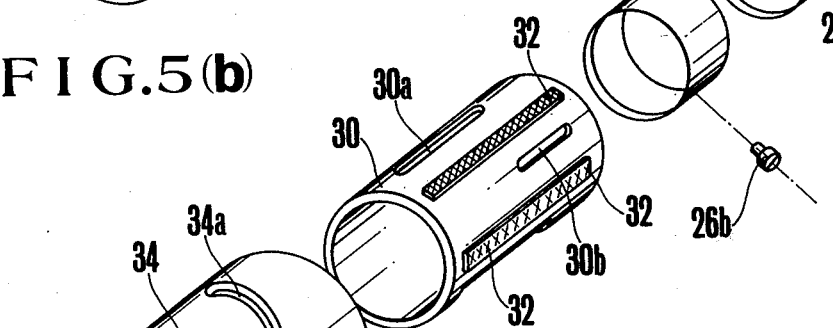
F I G.5(c)
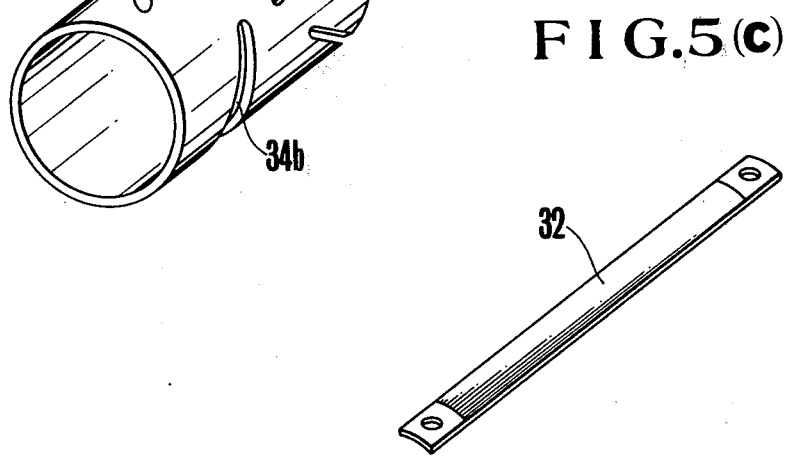

MOUNTING SYSTEM FOR OPTICAL LENS ASSEMBLY

BACKGROUND OF THE INVENTION

The present invention relates generally to optical lens assemblies and more particularly to a mounting mechanism for a system having lens members which are movable relative to each other.

In a conventional lens system, there are provided front and rear lens assemblies which are movable relative to each other. Such a system will include an inner lens barrel in which a front lens assembly is mounted and an outer lens barrel in which a rear lens assembly is mounted. Normally, the lens assemblies are fixedly mounted within the barrels and the inner lens barrel is movably fitted within the outer barrel which may be permanently or detachably mounted on the housing of an optical instrument such as a camera. The outer barrel may be provided with a pair of annular support projections which extend inwardly thereof and upon which the inner barrel may bear during axial movement thereof relative to the outer barrel in order to effect focusing operation.

In order that a mounting mechanism for such a lens assembly enable the performance of high speed movement with uniformity of operational force over the entire focusing range of the lens system, it is normally required that the inner and outer lens barrels be produced with very close manufacturing tolerances. It is well known in the art of machining such systems that when eccentricity or out-of-roundness of the barrels must be limited to specific and ideal values during the manufacturing thereof, production efficiency will be greatly decreased and production costs will significantly increase.

In order to further improve the smoothness of the sliding movement which must occur between the inner barrel and the outer barrel, other techniques may be employed. However, such other techniques have been found to be incompatable with improving the out-of-roundness of the elements. It is, therefore, virtually impossible to manufacture in inner and outer lens barrels in an economical manner while at the same time maintaining the eccentricity or out-of-roundness which arises to tolerances of such close values that sufficiently accurate and reliable control of focusing of the optical system may be accomplished while at the same time maintaining the operative forces involved constant over the focusing range.

In the case of zoom optical systems, conventional mounting mechanisms will give rise to similar unsolved problems particularly between the variator and/or compensator support barrel and the stationary barrel or a cam tube having zoom control cam slots. When the sliding surfaces of such barrels are finished by a lapping or rubbing operation or the like, in order to render the mechanism uniformly easy to operate from any desired position, there will occur a higher possibility of shifting of the optical axis of the zoom lenses thereby giving rise to misalignment relative to the relay lens during zooming.

A further problem which arises involves the fact that an outer stationary and an inner movable barrel must be machined by boring and milling operations, respectively, and as a result a great number of successive minute ridges will be formed on the facing surfaces of the inner and outer barrels. This will cause a disagreeable or undesirable feel and noise characteristic to occur when the inner barrel is moved relative to the outer barrel.

Accordingly, it is an object of the present invention to provide an economical approach in forming the operational mechanism for housing and operating an optical system involving relatively movable lens elements by compensating for deficiencies in the manufacture of the separate elements of the mechanism while nevertheless permitting operation of the movable lens element to be capable of accomplishment in a uniform manner with ease by an operator.

A further object of the invention is to provide a mounting device which will overcome the drawbacks of conventional systems and which will provide a lubricating device at the interface between an inner movable barrel and an outer stationary barrel of such a mechanism.

A further object of the invention is to provide a mounting mechanism for a telephoto or zoom optical system wherein the front component is movable for focusing or zooming, the remaining rear component being stationary during focusing or zooming, the mechanism comprising an inner barrel within which a front component is held and an outer stationary barrel or cam tube within which the rear component is held, with sliding mobility of the inner barrel relative to the outer barrel being enabled at a faster rate than would otherwise be possible while at the same time achieving improvement in the reliable operation of the overall optical system.

A further object of the invention is to provide a device for assuring improvement of reliable operation of an optical system while maintaining a satisfactory state of roundness between the inner and outer barrels by enabling omission of a rubbing or finishing step which has been heretofore necessary in order to impart a desired mobility into the operational mounting.

A further object of the invention is to provide an operational mechanical mounting for an optical system which will reduce or eliminate noisy operation which would otherwise occur by frictional engagement between the inner and outer barrels when they are moved relative to each other.

SUMMARY OF THE INVENTION

Briefly, the present invention may be described as a mounting mechanism for an optical system of lenses which includes an inner lens barrel and an outer lens barrel coupled together for relative movement therebetween in longitudinal directions thereof, the mounting mechanism comprising lubricating means inserted between the inner and outer barrels, with the lubricating means being affixed either to the external surface of the inner barrel or the internal surface of the outer barrel to prevent at least axial movement of the lubricating means relative to its mounting.

In one form of the invention, the lubricating means may be formed as elongated strips of lubricating material.

Alternatively, the invention may be formed as a cylindrical tube which is either apertured or formed with resilient embossed portions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIGS. 5(a)–5(c) are views showing still another embodiment of the invention applied to a mechanism for operating a zoom optical system, with FIG. 5(a) being a perspective view of an inner stationary guide barrel fitted in an outer cam tube, with FIG. 5(b) being an exploded perspective view of the parts of FIG. 5(a), and with FIG. 5(c) being a perspective view showing in greater detail one of the lubricating elements utilized with the embodiment shown in FIG. 5(b);

DETAILED DESCRIPTION OF THE PREFERRED EMBODIMENTS

Figure 1:
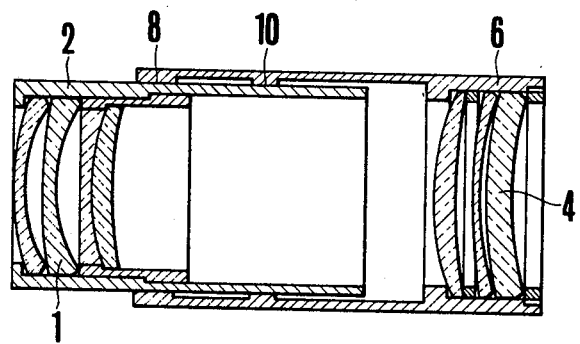
FIG. 1 is a sectional view of a conventional lens mounting system in accordance with the prior art of the type to which the present invention may be applied.

In the drawings, similar parts will be referred to with similar reference numerals throughout the various figures thereof.

In order to provide a basis for understanding the framework within which the present invention is applied, there is shown in FIG. 1 a prior art lens assembly formed in accordance with conventional principles. In the assembly of FIG. 1, an inner barrel 2 has mounted therein a front assembly 1 of lenses which is fixedly mounted within the barrel 2. An outer lens barrel 6 has mounted therein a rear assembly 4 of lenses, with the assembly 4 also being fixed relative to the barrel 6. The inner barrel 2 is movably fitted within the outer barrel 6, and the outer barrel 6 is permanently or detachably mounted on the housing of an optical instrument such as a camera (not shown). In order to provide for movement of the barrel 2 relative to the barrel 6, the assembly of FIG. 1 is formed with a pair of annular support projections 8 and 10 located on the inner surface of the outer barrel 6 and arranged so that the inner barrel 2 will bear thereagainst upon axial movement thereof to effect focusing of the lens assembly.

Figure 2A:
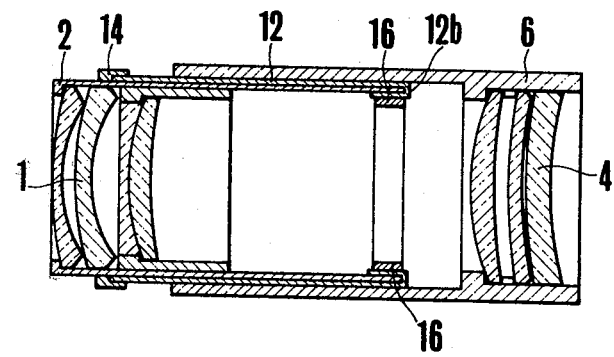
FIGS. 2(a)–2(d) are views showing a first embodiment of the invention adapted for mounting a two-component objective lens system in accordance with the present invention, with FIG. 2(a) being an axial sectional view of the mounting system, with FIG. 2(b) being a perspective view showing the lubricating device of the present invention with a part broken away for clarity, with FIG. 2(c) being a perspective view showing in greater detail one of the resilient elements of the lubricating system of the invention, and with FIG. 2(d) being a fragmentary radial sectional view of the inner and outer barrels of the device showing the resilient elements of the invention mounted therebetween.
Figure 2B:
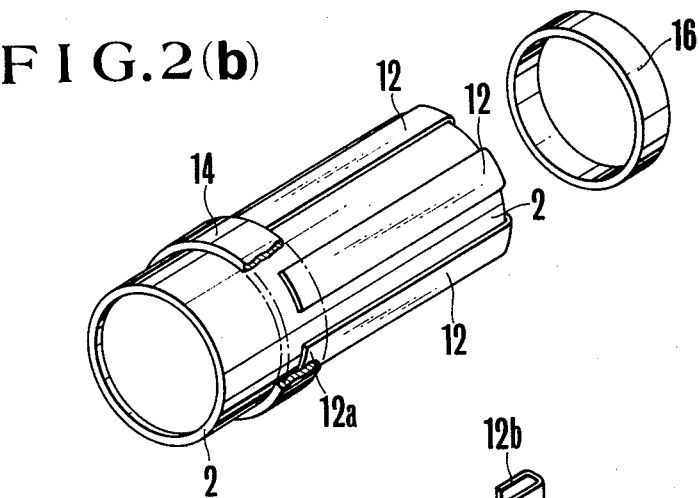
Figure 2C:
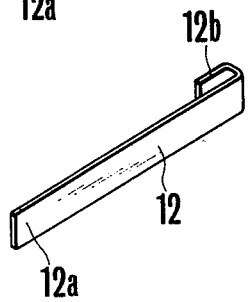

In the present invention, there is provided an improved mounting mechanism between the inner barrel 2 and the outer barrel 6 which will enable relative movement therebetween with enhanced operating features. A first embodiment of the invention is shown in FIGS. 2(a) to 2(d) wherein an operational mechanical mounting for a two-component objective lens system according to the present invention is depicted. The lens assembly of the invention also includes front and rear lens assemblies 1 and 4, respectively, the front assembly 1 being located within the inner movable support barrel 2 and the rear assembly 4 being located in the outer stationary support barrel 6. The outer barrel 6 fits over the inner barrel 2 and a lubricating device which is constructed in the form of a number of resilient strips 12 of lubricating material such as phospor bronze is arranged between the inner surface of the outer barrel 6 and the outer surface of the inner barrel 2. The strips 12 are positioned, in the case of the embodiment depicted, upon the outer peripheral surface of the inner barrel 2 in circumferentially equally spaced relationship to each other, as shown in FIG. 2(b). The strips 12 extend to insure a required range of axial movement of the front assembly 1 relative to the rear assembly 4. In order to fixedly secure the strips 12 upon the inner barrel, the rear ends of the strips are formed with bent ends 12b as best seen in FIGS. 2(a) and (c). These bent ends extend around the rear end of the inner barrel 2 so that an inner fastener ring 16 can press the bent ends 12b against the inner peripheral surface of the barrel 2 with the opposite ends 12a of the strips 12 being fixedly secured to the outer peripheral surface of the barrel 2 by an outer fastening ring 14. Thus, it will be seen that the strips 12 are affixed to prevent axial motion thereof relative to the inner barrel 2.

Figure 2D:
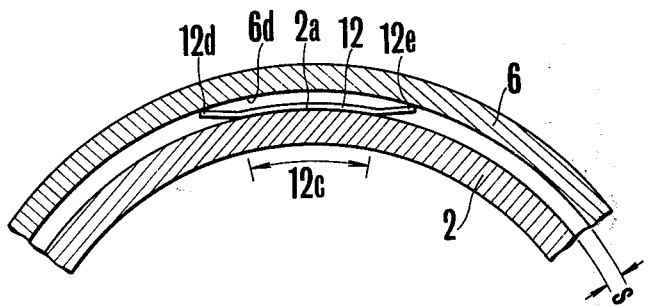

As shown in FIG. 2(d) each of the strips 12 may be conformed with regard to its lateral orientation to the outer diameter of the inner barrel 2 at a central section 12c thereof extending across the width of the strips 12. Longitudinal side sections 12d and 12e are deformed to extend from the central section 12c so that the side edges of the strip 12 will be pressed by a self-biasing effect against the internal surface 6d of the outer stationary barrel 6 in order to provide a clearance S between the inner and outer barrels 2 and 6.

In practice, the magnitude of the clearance S will usually be adjusted to be in the order of about 0.6 mm providing that the thickness of the strip 12 is on the order of 0.25 mm. The clearance S compensates for deficiencies in the manufacture of the inner and outer barrels 2, 6 and as a result the lubricating strips 12 will operate to provide a suitable operational mechanical mounting for the optical system including the lens assemblies 1 and 4 thereby giving rise to the advantage of reduced production cost for the mounting.

Because of the spring properties of the lubricating strips 12 there is assured a uniform and easy operation of the inner barrel 2 for axial movement of the front lens assembly 1 relative to the rear lens assembly 4 from any desired position by the operator.

In manufacturing lubricating strips 12, it is preferred to form the strips with a longitudinal orientation which will coincide with production plates utilized to form the strips from the raw material from which the strips are made.

Additionally, changes may be made in the specific construction for the lubricating strip 12 described above. For example, by elongating the strips 12 somewhat they may be formed to be curved in the longitudinal direction, as contrasted with the lateral direction, in order thereby to also operate to extend across the clearance S. This will provide an effect equivalent to that produced by the end portions 12d and 12e depicted in FIG. 2d.

Figure 3:
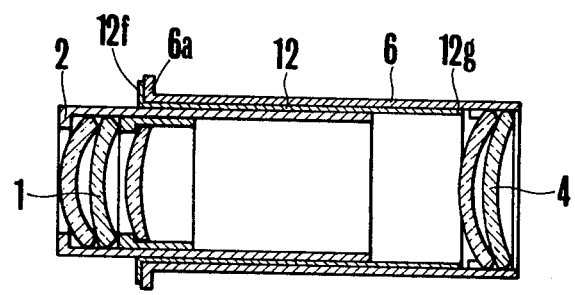
FIG. 3 is an axial sectional view showing an example of a modification of the mounting of FIGS. 2(a)–2(d)

A further example of a modification of the lubricating device of the invention is shown in FIG. 3. In this embodiment the lubricating strips 12 are fixedly secured to the outer barrel 6 instead of being fixedly secured to the inner barrel 2. In the case of the embodiment of FIG. 3, the front ends 12f of each of the strips 12 are rectangularly bent in order to conform with a shoulder of a front flange 6a of the outer barrel 6. The strips 12 may be fastened by screws, adhesive or other suitable means to the flange 6 with the opposite ends 12g of the strips 12 being either affixed to or freely fitted on the outer barrel 6.

Figure 4A:
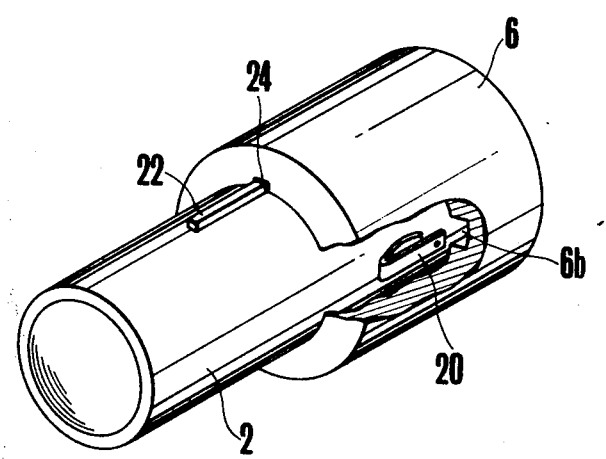
FIG. 4(a) is a perspective view showing another embodiment of the invention.
Figure 4B:
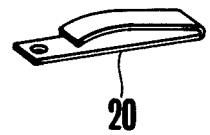
FIG. 4(b) is a perspective view showing in greater detail the lubricating element utilized in the embodiment of FIG. 4(a)

A somewhat simpler form of the lubricating device of the invention is shown in FIGs. 4(a)–(b). The type of device depicted in FIGS. 4(a)–(b) comprises a plurality of elements 20 each of which is made as a folded strip, with a fold or bend being provided at approximately the midpoint of the length of the strip 20, as best seen in FIG. 4(b). As will be seen from the drawings, the element 20 contains a flat or planar section by which it is fixedly mounted in a recess 6b formed in a portion of the internal surface of the outer stationary barrel 6, as best in FIG. 4(a). All of the lubricating elements 20 are arranged so that when the inner barrel 2 is coupled with the outer barrel 6, the inner barrel 2 will be suspended by the lubricating members 20 with an appropriate frictional force applied in a radial direction with reference to the optical axis of the lens assembly.

Axial movement of the inner barrel 2 is guided by a key 22 which is fixedly mounted on the internal surface of the barrel 2 and which is arranged in sliding engagement with a keyway or slot 24. Dimensional deficiencies which may exist in the manufacture of the inner and outer barrels 2 and 6 may be compensated for by the lubricating device 20 in a manner similar to that occurring with the device depicted in FIGS. 2(a)–(d).

FIGS. 5(a)–(c) depict a third embodiment of the present invention as applied to an operational mechanical mounting for a zoom optical system of which front and rear zoom members (not shown) are supported by lens cells 26 and 28, respectively. The cells 26 and 28 are movably fitted in the bore of an inner stationary guide barrel 30 and have guide rollers 26a and 28a movably mounted on the external surface thereof and radially outwardly extending into the slots 30a and 30b, respectively. An outer barrel 34 is coupled with the inner barrel 30 through a lubricating device comprising strips 32 in accordance with the present invention. The outer barrel 34 has circumferential camming grooves 34a and 34b into which extend cam followers 28b and 26b from respective lens cells 28 and 26 through slots (not shown) provided through the wall of the inner barrel 30. When the outer barrel 34 is rotated about the optical axis of the zoom assembly, the cells 26 and 28 are axially moved in differential relation to each other and to a relay lens (not shown) to effect zooming. The lubricating device of the invention comprises a plurality of the strips 32, one of which is schematically shown in FIG. 5(c). The strips 32 may be of the same general construction as that shown in FIG. 2(d). Each strip 32 is rigidly secured at both its ends to the external surface of the inner barrel 30. If a strip 32 is flat in the lateral direction, there arises a need to set the strip 32 in an arching configuration relative to the length of the inner barrel 30 so that a clearance, such as the clearance S shown in FIG. 2(d), may be formed to compensate for deficiencies in the manufacturing tolerances of the inner and outer barrels 30 and 34. Thus, the barrel assembly may be utilized to effect zooming operation with a uniform operative force of an appropriate magnitude.

Figure 5D:
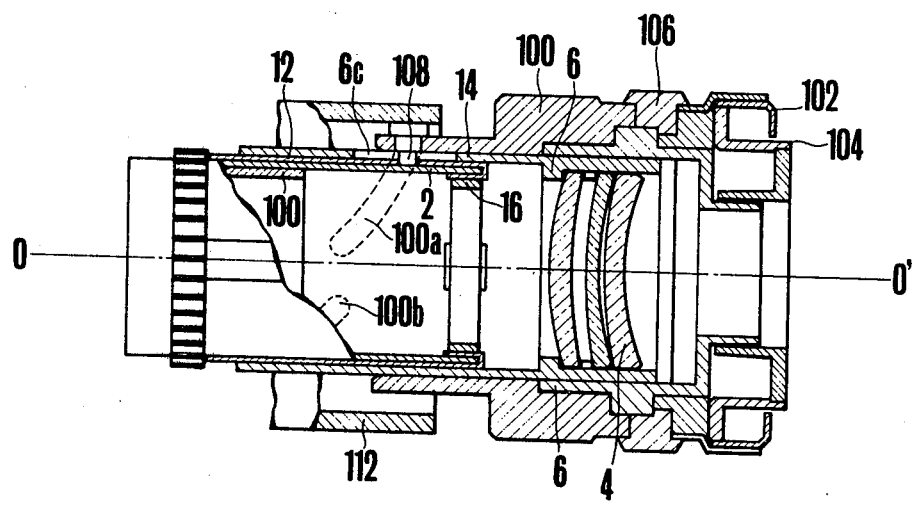
FIG. 5(d) is an axial sectional view showing an example of a modification of the embodiment depicted in FIGS. 5(a)–5(c)

FIG. 5(d) shows an example of a modification of the operational mechanical mounting shown in FIGS. 5(a)–(c) wherein a barrel assembly such as that shown in FIG. 2 is utilized. A zoom control ring 100 rotatably fits over the outer stationary barrel 6 which is connected to a single lens reflex camera (not shown) by a bayonet coupling 102 engageing with a mount 104 on the camera housing. Positioned rearwardly of the zoom ring 100 is a diaphragm ring 106. In order to permit longitudinal motion of the inner barrel 2 along the bore of the outer stationary barrels 6 by rotation of the zoom ring 100 about the optical axis 0—0', a pair of cam follower roll pins 108 extends from the inner barrel 2 through the lubricating device comprising lubricating members 12 and through longitudinal openings or slots 6c formed in the upper and lower portions of the outer barrel 6 to circumferential camming grooves 100a and 100b of the zoom ring 100. To actuate a focusing member (not shown) an actuating ring 112 is journaled on the zoom ring 100 at the front end thereof and is movable independently of the ring 100.

Figure 6A:
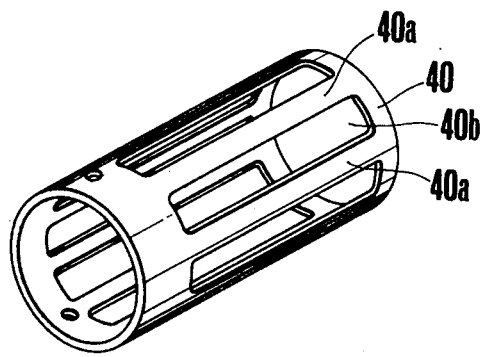
FIGS. 6(a) through 6(d) are each perspective views of four different examples of lubricating devices of the type which may be used with the present invention.
Figure 6B:
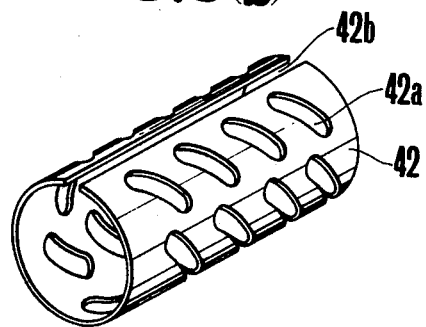

FIGS. 6a–6b show four additional examples of the structure of the lubricating device in accordance with the present invention each of which may be applicable not only to the operational mounting of FIG. 5 but also in the embodiments of FIGS. 2 to 4. Instead of using separate elements or strips 12, 20, or 32 in fabricating a device in accordance with the invention, a singular tubular element having a cylindrical configuration may be provided and be sufficient to construct the device so that the process of incorporating the device into the operational mechanical mounting may be simplified. The closed circular form shown in FIG. 6a comprises an apertured tube 40 which is adapted to utilize plastic as the material from which it is made with the tube 40 being provided with eight longitudinal openings 40b thereby forming eight longitudinal areas 40a between the openings which function as the lubricating elements. The apertured tube 40 may be fixed either on the inner barrel or on the outer barrel.

Figure 6C:
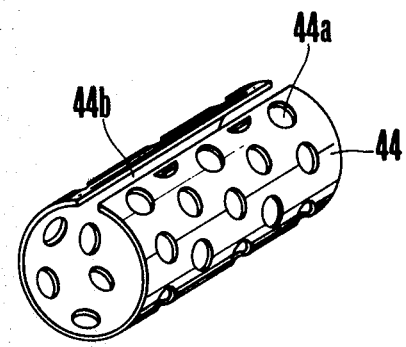

Other cylindrical or tubular forms of the invention which may also be utilized are the open circular forms shown in FIGS. 6(b) and 6(c) which are particularly suitable for utilization of materials such as phosphor bronze, stainless steel or the like in the manufacture thereof.

The tube 42 is provided with a number of oval openings 42a and it is cut along a longitudinal line 42b to form the open tubular configuration indicated. The tube 44 of FIG. 6c is provided with a number of round openings 44a and it is likewise cut along a longitudinal line 44b. The tubes 42 and 44 will provide a clamping effect on the external surface of the inner barrel as a result of the longitudinal cuts 42b and 44b. Furthermore, if the devices are to be used on the internal surface of the outer barrel there will likewise be developed an outwardly directed spring force which, in both cases, will make unnecessary the use of fasteners.

Figure 6D:
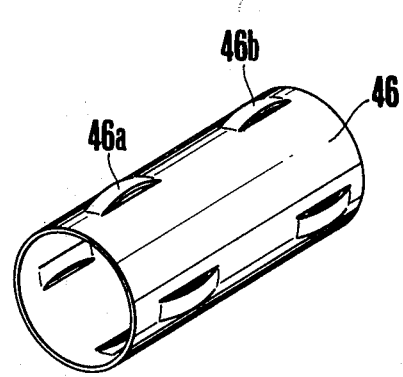

As shown in FIG. 6d, another form of the invention may comprise a tubular member 46 made of plastic or metal which may be embossed to form resilient portions 46a and 46b thereon. It is preferable to align each of the embossed portions 46a and 46b in the longitudinal direction and to locate them near either end of the tube 46 so that uniformity of operative force may be provided. Further, it is possible to improve the lubricity of the tubes 40, 42, 44 or 46 by applying a coating of carbon fiber on the external surfaces thereof when they are clamped in position between the inner and outer barrels. If oil is used as a lubricant, the openings 40b, 42a and 44a may serve as reservoirs for excessive quantities of lubricant oil which may be utilized.

Figure 7:
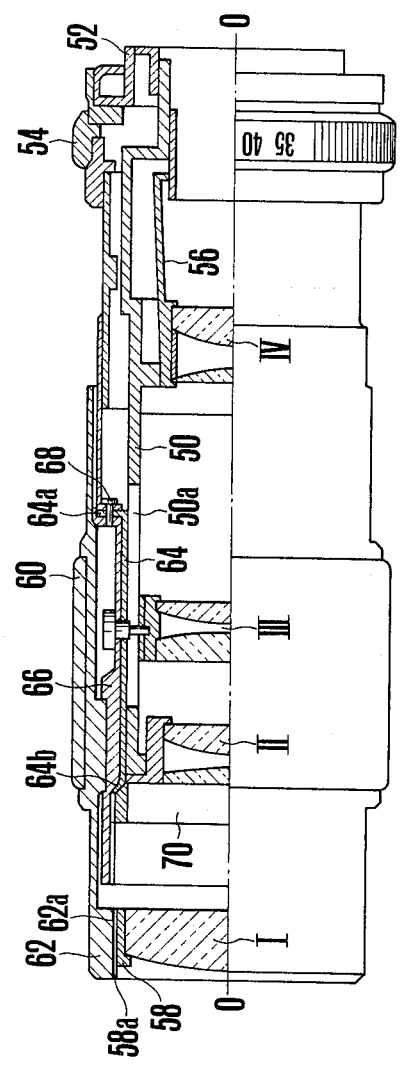
FIG. 7 is a partial sectional view of a further modification of an embodiment similar to that shown in FIG. 5(d).

FIG. 7 shows a fourth embodiment of the present invention as applied to an operational mechanical mounting for a zoom optical system of which a focusing front member I and a zoom member III are moved by a single actuating ring 60. The mounting is connected to a single lens reflex camera (not shown) by an adaptor 52. A diaphragm ring 54 is provided and a relay lens member IV is supported in a stationary cell 56. The focusing member I is supported in a rotatable cell 58 having an external screw thread 58a engaged in an internal screw thread 62a of a sleeve 62. A second lens member II is fixed in a stationary main tube 50 at the front end thereof. In order to permit longitudinal motion of the support cell of the zoom member III along the bore of the main tube 50 while preventing relative rotation of the cell therein, a longitudinal opening or slot 50a is formed in the upper portion of the main tube 50 in order to pass therethrough a pin from the lens cell III to a zoom control sleeve 66 and through a lubricating member 64 of the invention. When the actuating ring 60 is axially moved, the first and third lens members I and III are simultaneously axially moved. When the actuating ring 60 is subsequently rotated about an optical axis 0—0, the focusing member I is axially moved by rotative movement of the sleeve 62 with the zoom control sleeve 66 being maintained stationary during focusing.

The lubricating member or strip 64 which is provided in the embodiment of FIG. 7 may be similar to that of the embodiment of FIG. 2a in its general form with the exception that the front end of each strip 64 is radially outwardly curved into abutting engagement against the rear shoulder of a fastener ring 70 of the second lens member II in order to impart to the strip a spring property, with the rear end of the strip being fastened to an outwardly extending radial angular flange 64a by a screw 68. The magnitude of the spring force of the strip 64 may be adjusted by controlling the relative positioning of the fastener ring 70 to the main support tube 50.

It will be observed that the present invention provides a mechanism for housing and operating an optical system by means of a plurality of lens support members including inner and outer barrels or sleeves movable relative to each other in combination with one or more lubricating elements or members mounted either semipermanently or removably in a space between successive support members at the external or internal surfaces thereof, respectively. It will be understood that the lubricating device achieves a significant improvement in the performance of the operating mechanism. Furthermore, it will be seen that by the provision of the lubricating device it is possible to allow for increased tolerances in the dimensions of the finished support members. Furthermore, the lubricating device may be made to serve as a fine adjusting means for the magnitude of the operating forces developed in operation of the mechanism.

While specific embodiments of the invention have been shown and described in detail to illustrate the application of the inventive principles, it will be understood that the invention may be embodied otherwise without departing from such principles.

What is claimed is:

1. In a mounting mechanism for an optical system of lenses including inner lens barrel means and outer lens barrel means coupled together for relative movement therebetween in longitudinal directions thereof, the improvement comprising lubricating means interposed between said inner and outer lens barrel means, said lubricating means being fixed to either the external surface of said inner barrel means or the internal surface of said outer barrel means and being mounted to prevent at least axial movement thereof relative to the barrel means upon which it is mounted, said lubricating means being constructed in the form of at least one longitudinal strip inserted between said inner lens barrel means and said outer lens barrel means, said strip having a slide contact portion to effect sliding contact with said external surface of said inner lens barrel means or said internal surface of said outer lens barrel means, said strip having side edges thereof which are deformed to extend from said slide contact portion to produce a bias force between said inner lens barrel means and said outer lens barrel means, said lubricating means thereby operating to provide suitable lubrication for said mounting mechanism.

2. A mechanism according to claim 1 wherein said lubricating means comprise lubricating members constructed in the form of longitudinal strips inserted between said inner and outer barrel means, said strips having a pair of ends with at least one of the ends of each strip being bent off to extend around at least an end of said inner barrel means.

3. A mechanism according to claim 1 further including fastening means for mounting said lubricating means, said fastening means being constructed in the form of a ring inserted into the bore of said inner barrel means to press a portion of said lubricating means against the external surface of said inner barrel means.

4. A mechanism according to claim 1 wherein said lubricating means are constructed in the form of thin stips inserted between said inner and outer barrel means, said strips including a pair of ends, with at least one of the ends of each of said strips being bent to extend around at least one end of said outer barrel means.

5. A mechanism according to claim 4 further including a fastening member for fastening said lubricating means on the internal surface of said outer barrel means, said fastening means being constructed in the form of a ring located in engagement with said outer barrel means to press said lubricating means against the external surface of said outer barrel means.

6. In a mounting mechanism for an optical system of lenses including inner lens barrel means and outer lens barrel means coupled together for relative movement therebetween in longitudinal directions thereof, the improvement comprising lubricating means interposed between said inner and outer lens barrel means, said lubricating means being arranged between the external surface of said inner lens barrel means and the internal surface of said outer lens barrel means and being affixed relative to one of said lens barrel means to prevent at least axial movement thereof relative to the lens barrel means upon which it is affixed, said lubricating means being constructed in the form of at least one longitudinal strip inserted between said inner lens barrel means and said outer lens barrel means, said strip having a slide contact portion adapted to engage in lubricated sliding contact one of said external surface of said inner lens barrel means and said internal surface of said outer lens barrel means, said strip being formed with side edges which extend from said slide contact portion and which are deformed to effect compressed engagement of said at least one longitudinal strip between said inner and outer lens barrel means in order to provide a spring biasing force acting therebetween.

* * * * *